Aug. 1, 1967          H. E. SCHULTZE          3,333,867
SUSPENSION UNIT WITH PARALLEL SHOCK ABSORBERS
Filed July 26, 1965          2 Sheets-Sheet 1
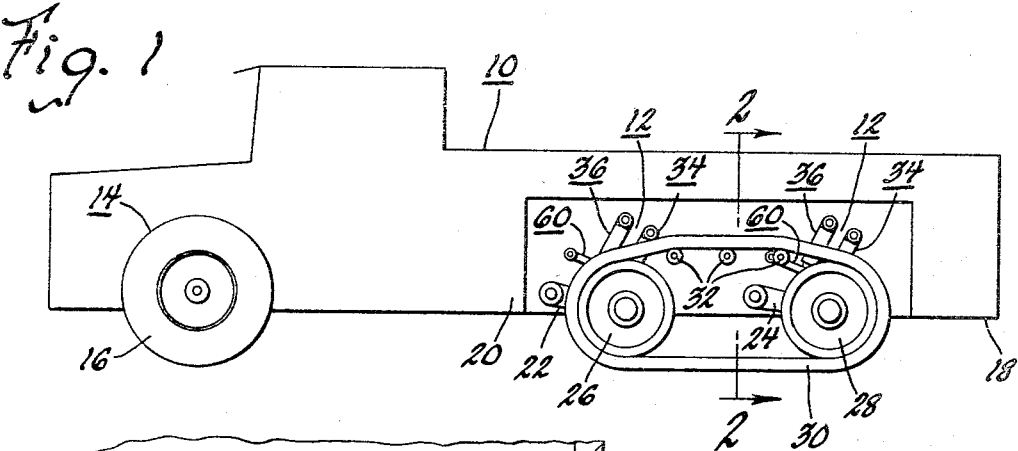
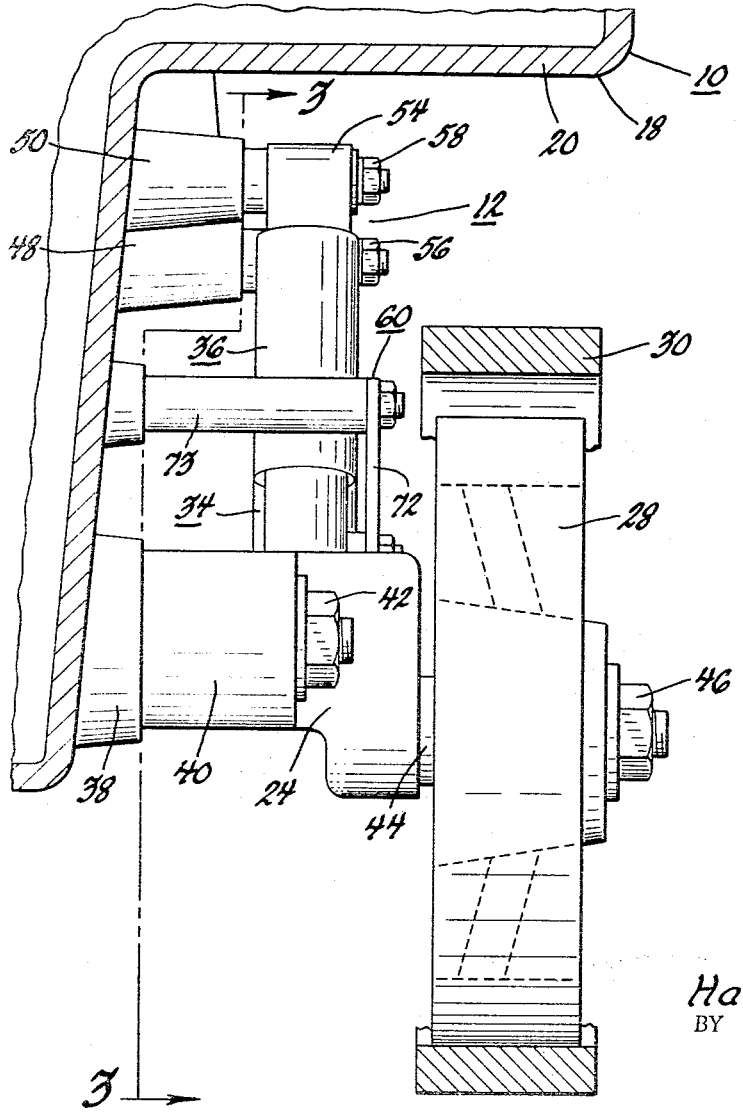
INVENTOR.
Harold E. Schultze
BY
J. C. Evans
HIS ATTORNEY INVENTOR.
Harold E. Schultze
BY
J.C. Evans
HIS ATTORNEY

United States Patent Office 3,333,867
Patented Aug. 1, 1967

3,333,867
SUSPENSION UNIT WITH PARALLEL SHOCK ABSORBERS
Harold E. Schultze, Dayton, Ohio, assignor to General Motors Corporation, Detroit, Mich., a corporation of Delaware
Filed July 26, 1965, Ser. No. 474,863
5 Claims. (Cl. 280—124)

ABSTRACT OF THE DISCLOSURE

In preferred form, a pivotal road wheel arm having a double crank lever pivotally secured thereto which in turn is connected to the ends of a pair of spaced apart hydraulic shock units each having the opposite end thereof adapted to be connected to a sprung vehicle mass and wherein the double crank lever connects to a compensating link on the sprung mass to continually maintain the parallel shock absorber in spaced parallelism throughout pivotal movement of the road wheel arm.

---

This invention relates to suspension systems and more particularly to suspension systems of the type including a pivotal road wheel arm connected between a sprung mass and an unsprung mass.

In the past, it has been suggested that plural shock absorbers be used in certain suspension system applications in order to obtain a multiplied damping action equivalent to that of a single, large-sized shock absorber. The provision of multiple shock absorbers has been found desirable since the heat built up in the shock absorbers can be dissipated through a greater exposed surface area. Furthermore, in certain cases, plural smaller sized shock absorber units fit in spaces that will not accommodate a single large counterpart unit.

An object of the present invention, therefore, is to improve suspension systems of the type including a sprung mass and an unsprung mass and a road arm connected between the masses and pivoted upon relative movement between the masses about a predetermined axis by the provision of a plurality of shock absorbers and means for operatively connecting the shock absorbers to the road arm wherein said means continually maintains said shock absorbers in parallelism throughout the operation thereof so as to produce an equal damping effect from each of said shock absorbers on said road arm throughout its pivoted movement.

A still further object of the present invention is to reduce bearing wear in shock absorbers that have a lower bearing mount adapted to be connected to a pivotal road arm connected between a sprung mass and an unsprung mass by the provision of a motion transfer member connected between the road arm and the lower bearing mount of the shock absorber that is associated with means for reducing the radial movement of the lower shock absorber bearing mount during pivotal movement of the road arm.

Further objects and advantages of the present invention will be apparent from the following description, reference being had to the accompanying drawings wherein a preferred embodiment of the present invention is clearly shown.

In the drawings:

FIGURE 1 is a diagrammatic view of a vehicle including the suspension system of the present invention;

FIGURE 2 is an enlarged, vertical, sectional view taken along the line 2—2 of FIGURE 1;

Figure 3:
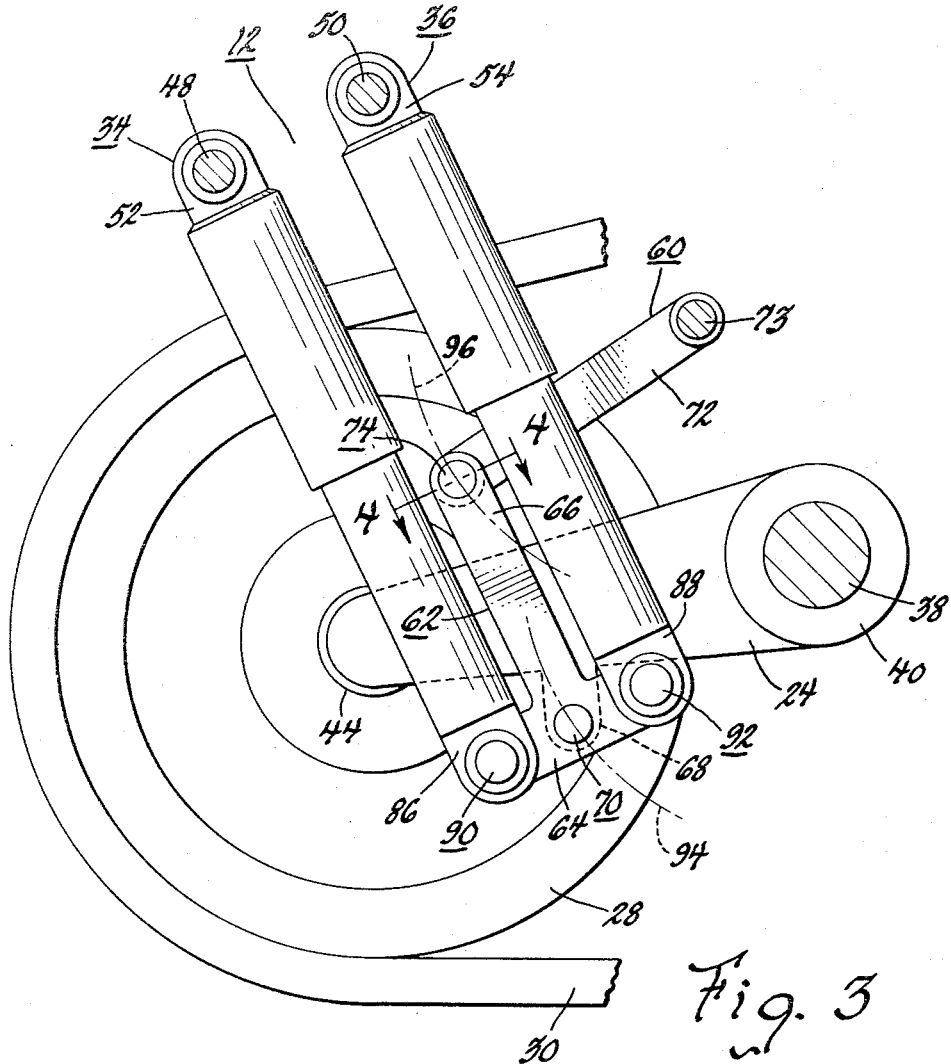
FIGURE 3 is a view in vertical section taken along the line 3—3 of FIGURE 2 looking in the direction of the arrows.

Referring now to the drawings, in FIGURE 1, a diagrammatic showing of a heavy-duty military type vehicle 10 is set forth including a rear suspension system 12 and a front wheel drive system 14 including a ground engaging wheel 16. The vehicle 10 includes a sprung mass represented by a vehicle body 18 having a hull portion 20 supported by a pair of road wheel arms 22, 24 pivotally secured at one end thereof to the hull 20 and having road wheels 26, 28 secured to the opposite ends thereof, respectively. Each of the road wheels 26, 28 has a continuous ground engaging track 30 passed thereover which is guided by a plurality of bogeys 32 in a conventional fashion. A like arrangement (not shown) is present on the opposite side of the vehicle body 18 on a hull portion like hull portion 20. In this arrangement, the road wheels 26, 28 represent an unsprung mass which follows the contour of the ground over which the track 30 passes to produce a relative movement of the unsprung mass with respect to the body 18 of the vehicle.

In accordance with certain of the principles of the present invention, each of the road wheel arms 22, 24 is connected to the hull 20 by a pair of spaced apart shock absorbers 34, 36. The shock absorbers 34, 36 are continually operative in response to pivotal movement of the road arms 22, 24 to cushion the relative movements between the road wheels 26, 28 and the vehicle body 18.

Referring now more particularly to FIGURES 2 and 3, the connection of the road arm 24 with respect to the body 18 is more detailedly set forth, with it being understood that the description of the connection of the road arm 24 is equally applicable to the road arm 22.

In FIGURE 2, the hull 20 of the body 18 is seen to include a mounting spindle 38 directed through a hub portion 40 of the road arm 24 and secured thereto by suitable means including a nut 42 threadably received on the threaded end of the spindle 38. The road arm 24 is pivotal about the spindle 38 and in the illustrated arrangement is inclined downwardly therefrom, as best seen in FIGURE 3. At the lower end of the arm 24 a road wheel spindle 44 on the road arm 24 is directed through the road wheel 28 and secured thereto by suitable fastening means shown as including a nut 46 threaded on a threaded end of the spindle 44.

The hull 20 also includes a pair of spaced apart spindles 48, 50 thereon, as shown in FIGURE 2, with the spindle 48 being directed through an upper bearing mounting assembly 52 on the shock absorber 34 and the spindle 50 being directed through an upper bearing mounting assembly 54 on the shock absorber 36. The shock absorbers 34, 36 are secured to the spindles 48, 50 by nuts 56, 58 threadably received, respectively, on threaded ends of the spindles 48, 50.

In the illustrated embodiment the shock absorbers 34, 36 are double-acting, hydraulic shock absorbers of the type including compression cut-offs operative upon a shock absorber compression stroke, produced in the illustrated embodiment by movement of the road wheel arm 24 upwardly with respect to the body 18, to produce a high degree of hydraulic damping of the movement of the road arm as the vehicle passes over rough terrain. The details of a representative one of such shock absorbers is more particularly disclosed in United States Patent No. 2,984,321, issued May 16, 1961. The details of the shock absorber form no part of the present invention and it should be understood that other types of shock absorbers depending upon the type of vehicle on which they are incorporated would be equally suitable in the suspension system of the present invention.

The provision of a pair of shock absorbers, as disclosed, enables a high degree of damping to be obtained within a space having limited dimensional characteristics such as is the case on a vehicle of the type disclosed. The damping effect of the pair of shock absorbers is equivalent to a single shock absorber assembly that would, in certain cases, be of such a size as to be unsuitable for location in space present between the sprung mass and unsprung mass of a vehicle.

Additionally, the provision of two shock absorbers results in an increased surface area as compared to a single shock absorber that will increase heat transfer from the hydraulic fluid within the shock absorbers thereby increasing the life characteristics of the damping components in the suspension.

In accordance with certain principles of the present invention, to fully utilize the damping characteristics of both of the shock absorbers 34, 36, it is necessary to operatively associate them with the road arm 24 so that they are continually maintained in spaced parallelism throughout the pivotal movement of the road arm 24 whereby, especially in the case of shock absorbers having compression cut-offs, both of the units are moved a like distance so that the compression cut-off effect in each of the units will occur substantially simultaneously. Thus, in the illustrated embodiment of the invention, the shock absorbers 34, 36 are associated with a parallelogram linkage system 60 that includes a motion transferring double crank lever 62 having a head portion 64 and a leg portion 66 directed upwardly with respect to the road arm 24. The head portion 64 of the lever 62 is pivotally connected to a depending portion 68 on the road arm 24 by a heavy-duty roller bearing assembly 70.

Figure 4:
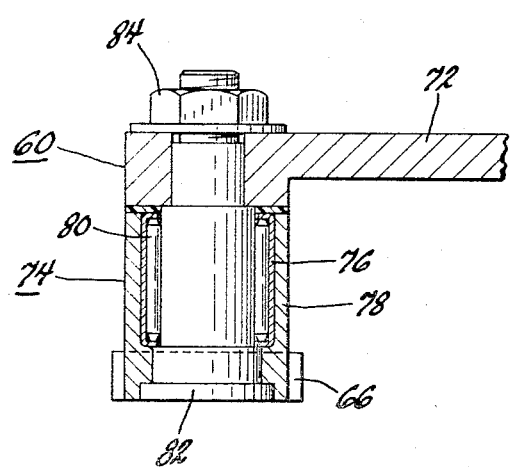
FIGURE 4 is an enlarged, fragmentary, sectional view taken along the line 4—4 of FIGURE 3.

A compensating link 72 in the system 60 is pivotally secured at one end thereof to a spindle 73 on the hull 20. The opposite end of the leg portion 66 is pivotally connected to a compensating link 72 by a like roller bearing assembly 74. The roller bearing 74 is more particularly illustrated in FIGURE 4 as including an outer race 76 supported within a hub 78 on the leg portion 66 to locate rollers 80 to rotatably support a pin 82 that is directed through the hub 78 and the roller bearing assembly 74 and secured to the compensating link 72 by suitable means such as a nut 84 threaded on the end of the pin 82.

The double crank lever 62 additionally is connected to each of the shock absorbers 34, 36 at bottom bearing mounting rings 86, 88, respectively, by swivel bearing assemblies 90, 92 at either end of the head portion 64 thereon to allow for a predetermined amount of movement of the shock absorbers to and from the hull 20 of the vehicle 18. The details of the swivel bearings 90, 92 form no part of the present invention but for purposes of illustrating a a typical assembly of this type, reference is made to copending United States application, Serial No. 414,377, filed November 17, 1964.

The illustrated parallelogram linkage system 60 maintains the shock absorbers 34, 36 continually in parallelism irrespective of the pivotal movement of the road arm 24 in the following manner. Upon pivotal movement of the road arm 24, the axis of the bearing 70 of the double crank lever 62 follows an arc 94 and the compensating link 72 directs the bearing assembly 74 along an arc 96 whereby, throughout the pivotal movement of the road arm 24, the double crank lever 62 is maintained at a constant attitude with respect to the road arm 24. Accordingly, the head portion 64 of the lever 62 is positioned so that the axes of the shock absorbers 34, 36 are always maintained parallel with one another.

The double crank lever 62 additionally in serving to transmit the motion of the road arm 24 to the shock absorbers 34, 36 acts to minimize the rotative movement of the head portion 64 with respect to the end bearing mounting rings 86, 88 of the shock absorbers to reduce the relative rotative movements of the swivel bearings 90, 92 so as to reduce wear therein. The pivotal movement of the road arm 24 is primarily carried by the heavy-duty roller bearing 70 which is more suited for taking up the stresses encountered during such movement as compared to the swivel bearings 90, 92 on the bottom bearing mounts 86, 88 of the shock absorbers.

By virtue of the above-described arrangement, the shock absorbers 34, 36 continually act to direct a substantially equal damping effect on the road wheel arm 24 that, when multiplied, is equivalent to a single large-size shock absorber that would in many cases be of a configuration that would not fit between a pivotal road wheel arm and an adjacent hull portion of a military vehicle or the like. The provision of the illustrated double crank lever 62 and the compensating link 72 additionally insures a continuous alignment of the shock absorbers 34, 36 that will fully utilize both of their damping characteristics.

While the embodiment of the present invention as herein disclosed constitutes a preferred form, it is to be understood that other forms might be adopted.

What is claimed is as follows:

1. In a vehicle suspension system including a sprung mass and an unsprung mass, the combination of, a road wheel arm pivotally connected between said sprung and unsprung masses for pivotal movement about a predetermined axis upon relative movement between the sprung and unsprung masses, a pair of spaced apart shock absorbers, means for pivotally connecting one end of each of said spaced apart shock absorbers to the sprung mass, parallelogram linkage means connecting the opposite ends of said shock absorber to said road arm, said linkage means including a motion transfer member pivotally secured to said road arm, said motion transfer member being pivotally connected to the said opposite end of each of said shock absorbers, said parallelogram linkage means including means for maintaining said motion transfer member at a predetermined attitude throughout the pivotal movement of said road arm, the attitude of said motion transfer member continually maintaining said shock absorbers in spaced parallelism throughout the pivotal movement of said road arm whereby said road arm has the movement thereof equally damped by each of said shock absorbers.

2. In a suspension system for association with a sprung mass and an unsprung mass, the combination of, a road arm, means for pivotally connecting one end of said road arm to the sprung mass for pivotal movement relative thereto about a predetermined axis, means for connecting the other end of said road arm to the unsprung mass, a pair of spaced apart shock absorbers, means for securing one end of each of said shock absorbers to the sprung mass, means including a crank member for connecting the opposite end of said shock absorbers to said road arm, said crank member having spaced apart portions thereon pivotally secured to the opposite ends of said shock absorber for establishing parallelism between said shock absorbers, and compensating link means connected to said crank member and to a fixed reference point operative upon pivotal movement of said road arm to adjust said crank member to maintain said shock absorbers in parallelism throughout the pivotal movement of said road arm.

3. In a suspension system for a sprung mass and an unsprung mass, the combination of, a road arm adapted to be connected between the masses for pivotal movement about a predetermined axis upon relative movement between the masses, a pair of spaced apart shock absorbers for damping the pivotal movement of said road arm, means for connecting one end of each of said shock absorbers to the sprung mass, said road arm having a depending portion thereon between its ends, a T-shaped crank member having a head portion and a leg portion, means for pivotally connecting said head portion of said crank member to said depending portion, a compensating link having one end pivotally connected to said leg portion of said crank member and its opposite end adapted to be pivotally connected to the sprung mass, said compensating link being operative upon pivotal movement of said road arm to maintain said crank member at a constant attitude throughout the pivotal movement of said road arm, said shock absorbers having the opposite ends thereof connected to spaced apart end portions on said crank member head portion by means including swivel bearings, said crank member serving upon pivotal movement of said road arm to maintain said shock absorbers in spaced parallelism throughout the movement of said road arm whereby the damping effect of each of said shock absorbers is substantially equally effective to damp the movement of said arm throughout its complete movement.

4. In a suspension system, the combination of, a sprung mass, an unsprung mass, a road wheel arm connected between said masses and pivotal about a predetermined axis upon relative movement between said masses, first and second shock absorbers located in spaced parallelism, means for pivotally connecting said shock absorbers to said sprung mass, means for pivotally connecting the opposite ends of said shock absorbers to said road wheel arm, said means for connecting said shock absorber to said road wheel arm including motion transfer means and means for adjusting the effect of said motion transfer means in accordance with the pivotal movement of said road arm so that each of said shock absorbers produces a like damping effect on said road arm throughout its pivotal movement, said motion transfer means including a crank element, a roller bearing connecting said crank element to said road wheel arm, swivel bearing means connecting said crank element to each of said shock absorbers, said crank element being positioned by said compensating link means whereby said pivotal movement of said road arm is primarily carried by said roller bearing without causing substantial movement of said swivel bearing means.

5. In a suspension system for association with a sprung mass and an unsprung mass, the combination of, a road wheel arm adapted to be connected between the masses and pivotal about a predetermined axis upon relative movement between the masses, means for damping pivotal movement of said road arm including a pair of spaced apart shock absorbers, said spaced apart shock absorbers each having a predetermined damping effect, means for operatively connecting said shock absorbers to said road wheel arm whereby the damping effect of each of said shock absorbers is continually and equally effective throughout the pivotal movement of said road wheel arm, said means for operatively connecting said shock absorbers to said road wheel arm including parallelogram linkage means that continually maintains said shock absorbers in spaced parallelism throughout the pivotal movement of said road wheel arm, said parallelogram linkage means including a motion transmitting crank member, a roller bearing connecting said crank member to said road arm, swivel bearing means connecting said shock absorbers to said crank member, and means including a compensating link for maintaining the attitude of said crank member constant throughout the pivotal movement of said road wheel arm whereby said swivel bearing means are subjected to a minimum amount of rotative movement during the pivotal movement of said road wheel arm.

References Cited
UNITED STATES PATENTS 2,342,381  2/1944  Thornhill _____ 267—15

FOREIGN PATENTS 804,513  4/1951  Germany.

BENJAMIN HERSH, *Primary Examiner.*

P. GOODMAN, *Assistant Examiner.*